June 10, 1969  L. E. WHITE  3,449,007
FOLDING GAFF
Filed Oct. 14, 1966
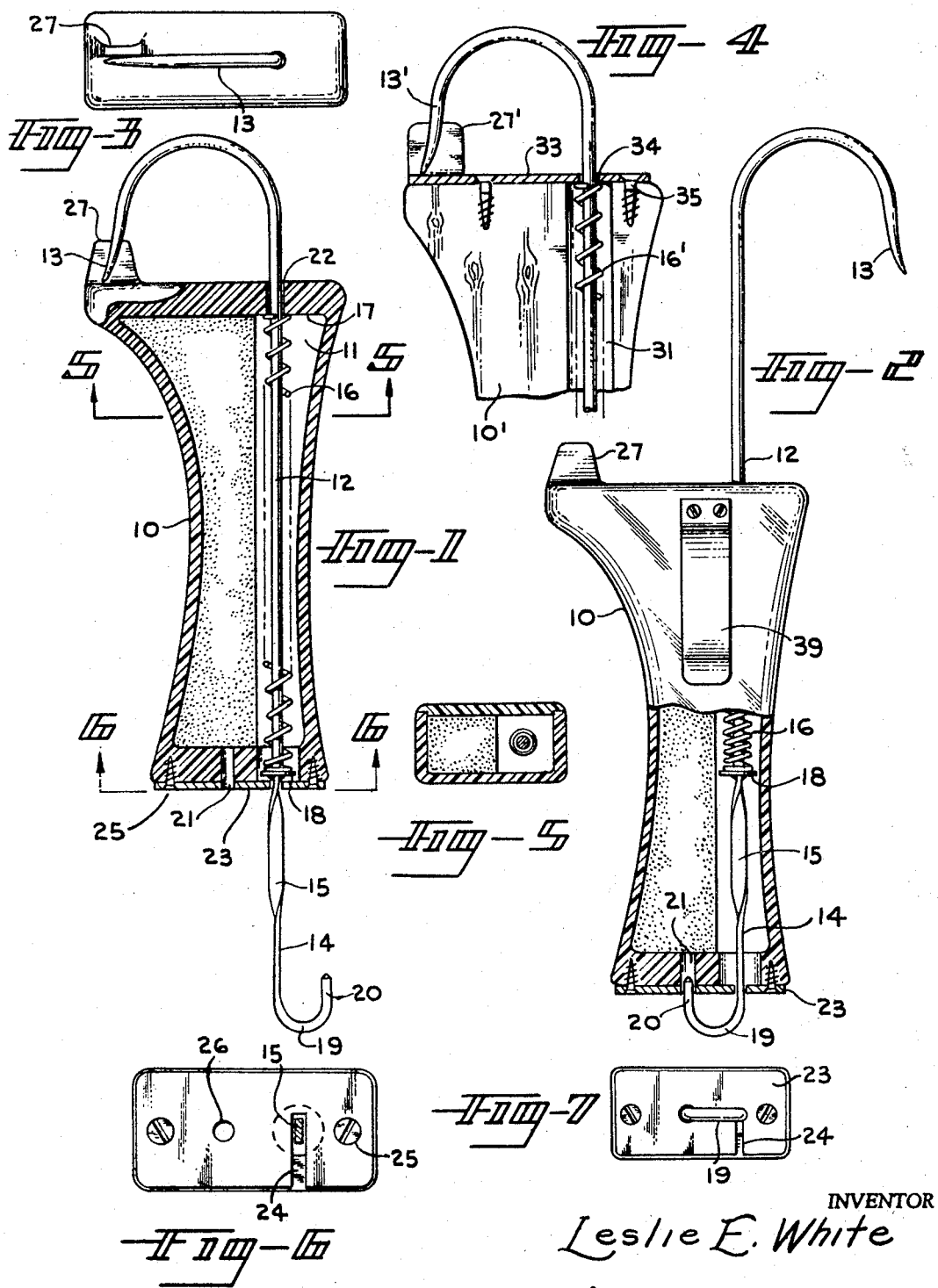
INVENTOR
Leslie E. White
BY Julian E. Renfro
ATTORNEY

United States Patent Office 3,449,007
Patented June 10, 1969

3,449,007
FOLDING GAFF
Leslie E. White, 124 S. Japonica Drive,
Orlando, Fla. 32807
Filed Oct. 14, 1966, Ser. No. 586,821
Int. Cl. A01k 97/14
U.S. Cl. 294—26          4 Claims

ABSTRACT OF THE DISCLOSURE

This invention relates to a folding gaff having a hook that can be deployed into operative position by a fisherman even though he has only one hand free for accomplishing this purpose. This one handed deployment is made possible by the fact that the hook portion of the gaff is integral with a shank slidable in the handle of the device, and on the lowermost portion of this shank, means are provided so that the fisherman can push or strike such means against a part of his body or on a near-by object, thus to cause the hook to extend into the position for gaffing a fish.

---

This invention relates to a retractable fish gaff, and more particularly to a gaff eminently suitable for use by fishermen inasmuch as it is of lightweight, floating construction, but more importantly, because it is arranged so that it can be deployed by a one handed operation from a folded position into an active position.

In the past, a number of folding gaffs have been proposed, but these have been characterized by their complexity, cost and difficulty in use. One such device employs a fish weighing scale in its handle, whereas others have utilized a spring-biased trigger that must be operated before the fisherman can deploy the gaff into the operative position by the use of his two hands. These and other complex devices are necessarily expensive, and because of the manner in which they are operable, are of little value to the fisherman at such time he has a strike, unless of course he has already moved the hook to the active position, in which case it forms a definite safety hazard. Further, many of these prior art devices necessarily involve the hook being so arranged with respect to the handle that when it is in the active position, it makes only downstrokes possible, often causing the fish to be lost inasmuch as the fisherman is unable to penetrate the hard, scaled back of the fish he has caught.

The present invention utilizes a lightweight, readily accessable, foam filled hollow handle in which the elongated metal shank portion of the present hook is slidable. A portion of the shank is of flat or rectangular cross-section, with a twist being formed therein in such relationship to the handle of the device as to automatically cause the hook portion of the device to swing into the most appropriate position for gaffing the fish, at such time as the shank is caused to move through the handle so as to bring about movement of the point of the hook into the position spaced the maximum distance from the handle. A compression spring in the handle encircles the shank, and normally biases the point of the hook into an out-of-the way position against a stop provided on the handle, but this spring is of course overcome at such time as the hook is extended.

Significantly, the lowermost portion of the metal shank is bent to form a type of locking device, with the bent portion being of such construction that the fisherman can bring it sharply into contact with his upper leg or hip, and thereby bring about the extension of the hook portion of the gaff into the position in which it may be used in a most advantageous manner. Upon this operation being carried out successfully, the locking device is automatically brought into operation, which prevents any undesirable rotation of the hook when it is in use.

As will be appreciated, the one-handed operation made possible by this construction is of particular value when the fisherman is holding his rod in one hand and only has the other hand available for removing the gaff from his belt or clothing and bringing the gaff into operation. Though not as important, it is also possible to bring about the retraction of the gaff by the use of only one hand, this being accomplished by the user pressing the upper rounded portion of the hook against his upper leg or hip, so as to disengage the locking device and allow the spring to move the shank along the inside of the handle until the twist in the shank accomplishes the desired rotation of the hook portion back into the safe storage position. The spring is of sufficient strength to bring about self-closing of the gaff when the hook has been pressed toward the handle a sufficient amount as to disengage the automatic locking device, and strong enough also to normally retain it in this closed position. It should be noted that the present construction is highly advantageous both from the standpoint of safety and effectiveness. The hook cannot be deployed accidentally inasmuch as it is held closed by the aforementioned spring, and when it is deployed, it is in such a position with respect to the handle that the fisherman is able to make upward strokes with the hook, meaning of course that he can easily penetrate the soft underbelly of the fish and make escape unlikely.

It is therefore a principal object to provide a folding gaff that can be deployed into the operative position easily, even though the user has only one hand free.

It is another object to provide a folding gaff having means to rotate its hook as it is being deployed, therefore to dispose the hook in the optimum position with respect to the handle.

It is still another object to provide a folding gaff having automatic locking means that comes into play when the hook is deployed, to prevent undesired rotation of the hook with respect to the handle.

These and other objects, features and advantages will be made more apparent from a study of the appended drawing in which:

FIGURE 1 is a view partly in section of the gaff in accordance with this invention, showing the use of a plastic handle, and the hook portion in the stowed position;

FIGURE 2 is a view generally relatable to FIGURE 1, but showing the hook in the active position and the locking device in the engaged position;

FIGURE 3 is a top view of my gaff, showing how the sharpened portion of the hook normally rests against a stop;

FIGURE 4 is a partial view of an embodiment in which the handle is made of wood;

FIGURE 5 is a cross-sectional view taken along lines 5—5 in FIGURE 1;

FIGURE 6 is a view, to a somewhat larger scale, taken in the direction of arrows 6—6, revealing details of the metal plate utilized on the lower portion of the handle; and FIGURE 7 is a view at normal scale, revealing the appearance of the lower part of the gaff when the locking device is in the engaged position.

Referring first to FIGURE 1, the handle 10 is preferably of lightweight construction, such as of plastic or other suitable material, and contoured so as to be comfortably held in one hand. The inner part of the handle may be hollow, with one portion filled with lightweight foam plastic for example, whereas through another portion thereof, the shank 12 associated with the hook 13 and locking device 20 is slidable. The shank is typically formed from the same piece of noncorrosive metal from which the hook 13 is formed, with the lower portion 14 of the shank extending sufficiently far below the handle as to form a portion that simplifies the deployment of the hook 13 into the extended position shown in FIGURE 2. This and other metal components of my device may for example be of stainless steel, or appropriately plated steel.

The lower portion 14 of the shank is of flat or rectangular cross-section with a twist 15 being formed therein so as to bring about an automatic rotation of the hook at such time as the hook is caused to be deployed. As will be noted from comparing FIGURES 1 and 2, the hook is caused such as by two 90° twists to rotate approximately 180° at such time as the lower portion 14 of the shank has been pushed into the handle to deploy the hook.

A spring 16 is utilized inside the handle in a surrounding relationship about the shank 12, with the spring in this instance being a compression spring extending between the upper undersurface 17 of the handle, and a washer 18 disposed between the shank portions 12 and 14. As will be noted from FIGURE 2, the washer 18 may be welded or otherwise secured to the shank, thus to prevent an undesired sliding of the washer toward the twist 15 when the spring is caused to be compressed by the deployment of the hook. It is to be noted that I am not to be limited to a compression spring, however, for another type of spring arrangement may be used if preferred.

In order to make possible a one-handed deployment of the hook, I round the lowermost portion of the lower shank as will be noted at 19, and by the user pressing this portion against his thigh or hip, for example, he can cause the shank to slide in the spring-compressing direction in the handle so as to move the hook 13 into the active position to be seen in FIGURE 2. Further, by causing a lower hook-like portion 20 to be formed, which portion 20 can be received in a recess 21 in the lowermost portion of the handle, a form of locking device is created which desirably prevents the hook 13 from rotating with respect to the handle while the fisherman is endeavoring to gaff a fish. The locking device also serves to hold the hook in the open position. Note in FIGURE 2 this locking detail.

As to other constructional details, the upper portion of the shank 12 can be arranged to be slidable in a hole 22 drilled or otherwise formed directly in the handle 10, but inasmuch as the twist 15 would cause rapid wear in the bottom part of the handle, I prefer to use a metal plate 23 at the lowermost portion thereof, which plate has a slot 24 therein in which the lower shank 14 slides in close-fitting relationship. This plate is held in position by the use of screws 25 or the like, and is provided with a hole 26 in alignment with the aforementioned recess 21; note FIGURE 6. The hook-like portion 20 is spaced from the shank 14 a distance equal to the spacing of hole 26 from slot 24, thus assuring that the portion 20 will easily enter hole 21, 26 on occasion.

It will now be apparent why it was specified that the lower shank portion is formed so as to be of flat or rectangular configuration, for it is by the interaction of the twist 15 in close relationship with the slot 24 that the rotation of the hook is brought about when the shank is caused to slide through the handle. Also, the relationship of the shank 14 to the slot 24 is such as to assure the hook 13 being maintained in the desired orientation, whether the hook is in the extended or the withdrawn positions. For example, the relationship of the shank portion 14 below the twist is such that the hook-like portion 20 enters the recess 21, 26 when the hook 13 is in the correct deployed position with respect to the handle. The slot 24 extends through to one side of the metal plate 23 to simplify assembly.

Referring to FIGURES 1 and 3, it will be noted that an upper protuberance 27 is provided at an upper portion of the handle, this arrangement providing a stop or rest against which the point of the hook can reside when in the retracted position, and at the same time minimizing the likelihood that the hook will snag on the wearer's clothing.

Referring to FIGURE 4 it will be noted that the handle 10' in this embodiment can be made of wood, in which event a hole 31 is drilled or otherwise formed through the handle to receive the shank and spring. In this embodiment, I preferably employ an upper metal plate 33 having a hole 34 through which the shank is slidable, and against the underside of which the upper end of the spring 16' may reside. This metal plate may be held in position by screws 35 or the like, and may be provided with a stop 27', comparable to the stop of the plastic handle embodiment, against which hook 13' may at times rest.

Referring now to FIGURE 2 it will be noted that provided on an upper portion of the handle is a clip 39 that enables the fisherman to fasten the gaff to his clothing when not in use. However, by removing the gaff from his clothing with one hand and then pressing the lowermost portion 19 of the shank against his body, boat, or some other film object, he can cause the hook 13 to be swung into the deployed position in which it is most advantageously operable, with the locking arrangement 20, 21 preventing undesired hook movement until retraction is desired. By providing a spring 16 or 16' of sufficient strength, retraction can be virtually automatically brought about when desired, merely by applying sufficient pressure against the rounded portion of the hook 13 as to cause disengagement of the lower hook-like portion 20 from recess 21.

As is therefore to be seen, I have provided a highly advantageous new folding gaff that should prove to be of great benefit to the fisherman that is concerned with holding a fishing rod in one hand, and being concerned with gaffing the fish with the other hand, for as explained at length herein, my folding gaff can be rapidly and effectively deployed by the use of only one hand. The gaff is of lightweight construction, and the handle of such buoyant material, wood or plastic, that even if dropped in the water, it will float so it will be easily retrieved. By providing a clip on the handle, it can be attached to the wearer's clothing so as to be readily accessible when needed.

The sharpened hook portion, when deployed is advantageously rotated to the most advantageous position with respect to the handle so as to enable the fisherman to make upward type strokes, thereby to easily penetrate the soft underbelly of a fish.

I am of course not to be limited to folding gaffs of the size shown, for obviously I can use much longer handles, and of course longer shank portions, when it is desired to provide a folding gaff of the size to be carried on the deck of a boat, for example.

Although I have set forth a preferred embodiment of my invention, I am not to be restricted to the precise constructional details shown and described herein.

I claim:

1. A folding gaff comprising a lightweight handle adapted to be held in one hand, an elongated metal shank slidable lengthwise through said handle and forming at the upper end thereof a hook having a sharpened portion upon which a fish or the like can be gaffed, said shank being of such a length as to extend through said handle, said sharpened portion of said hook being movable between a folded position in which the lower portion of said shank extends for a distance below said handle and said sharpened portion of said hook is disposed closely adjacent an upper portion of said handle, and a deployed position in which said sharpened portion is spaced a distance from the upper part of said handle, means disposed at said lower portion of said shank so that one-handed deployment of said hook can be accomplished by the application of pressure to said means, thus to cause the sliding of said shank in said handle, and automatic locking means for releasably locking said lower portion of said shank to the lower portion of said handle when said hook has been moved to the deployed position, thus preventing undesired rotation of said hook with respect to said handle.

2. A foldinng gaff for use by a fisherman or the like comprising a lightweight handle adapted for one-hand operation, an elongated metal shank slidable lengthwise through said handle and forming at the upper end thereof a hook having a sharpened portion upon which a fish or the like can be gaffed, said shank being of such a length as to extend through said handle and normally for a distance below said handle, means for biasing said shank in the direction as to cause the sharpened portion of said hook normally to be retracted into a stowed position adjacent an upper portion of said handle, said hook being deployable into an operative position in which said sharpened portion is spaced a distance from the upper part of said handle, means at the lower portion of said shank such that deployment can be accomplished by the application of pressure in the bias-overcoming direction to said means, thus to cause the sliding of said shank in said handle, and automatic locking means for releasably locking said lower portion of said shank to the lower portion of said handle when said hook has been moved to the operative position, thus preventing undesired rotation of said hook with respect to said handle.

3. The folding gaff as defined in claim 2 in which said automatic locking means is formed as a result of said lower portion of said shank being formed into a generally U-shaped bend, with one arm of said U-shaped bend being disposed so as to enter a complementary recess located in the lower portion of said handle.

4. The folding gaff as defined in claim 2 wherein said gaff is sufficiently buoyant to float on water.

References Cited

UNITED STATES PATENTS

| | | | |
|---|---|---|---|
| 2,570,538 | 10/1951 | Fincher | 294—26 |
| 2,799,527 | 7/1957 | Cederblad | 294—26 |
| 3,101,964 | 8/1963 | Reaser | 294—26 |

RICHARD E. AEGERTER, *Primary Examiner.*

HARVEY C. HORNSBY, *Assistant Examiner.*